AUTOMATIC FREQUENCY CONTROL CIRCUIT
Filed July 10, 1952
3 Sheets-Sheet 1
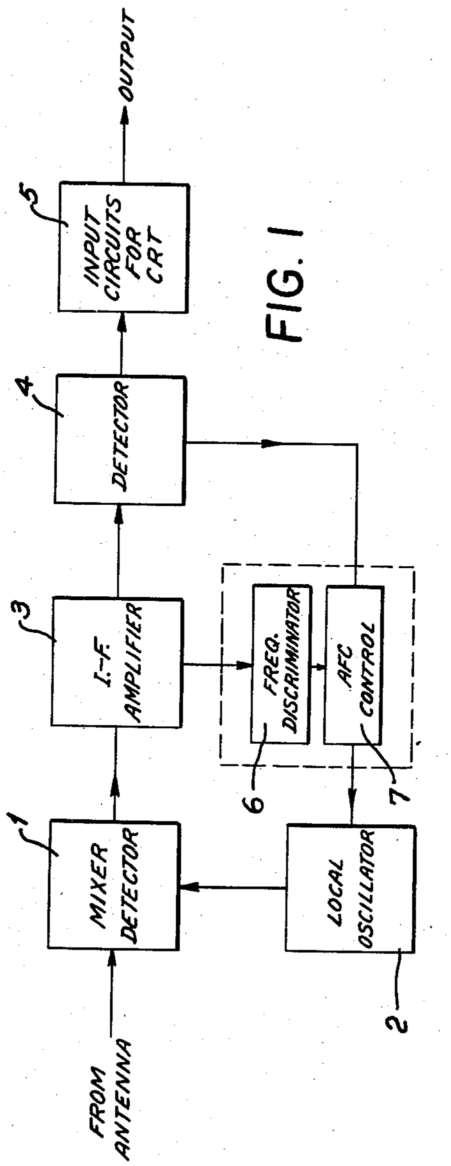
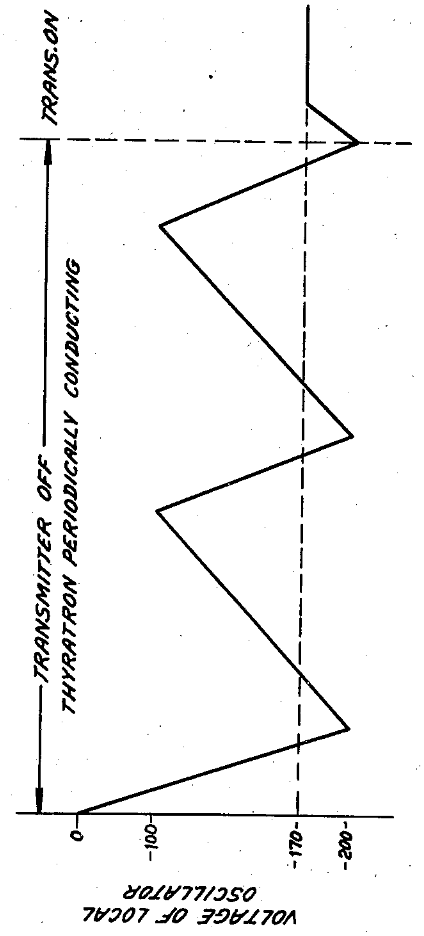
FIG. 3
INVENTORS.
MERITT L. MILLER
ROBERT W. BUTLER
BY
Philip M. Bolton
ATTORNEY INVENTORS.
MERITT L. MILLER
ROBERT W. BUTLER
BY
Philip M. Bolton
ATTORNEY June 10, 1958 M. L. MILLER ET AL 2,838,671

AUTOMATIC FREQUENCY CONTROL CIRCUIT

Filed July 10, 1952 3 Sheets-Sheet 3

INVENTORS.
MERITT L. MILLER
ROBERT W. BUTLER

BY Philip M. Bolton

ATTORNEY

United States Patent Office 2,838,671

Patented June 10, 1958

2,838,671

AUTOMATIC FREQUENCY CONTROL CIRCUIT

Meritt Lavon Miller, Fort Wayne, Ind., and Robert W. Butler, Mission, Kans., assignors to Farnsworth Research Corporation, Fort Wayne, Ind., a corporation of Indiana Application July 10, 1952, Serial No. 298,138

7 Claims. (Cl. 250—36)

This invention relates to circuit means for automatically controlling the frequency of an oscillator and has particular utility in controlling the frequency of the local oscillator in a radar system.

More particularly, the automatic frequency control (AFC) circuit of this invention is of the sweeping type which applies a sweep voltage to the frequency controlling electrode of an oscillator (for example; the repeller electrode of a reflex-klystron) over the operating band of frequencies, and has circuit means for terminating the sweep and controlling the particular frequency in the swept band at which the oscillator operates. In most radar systems, the local oscillator is a reflex-klystron and its frequency is controlled by the voltage on its repeller. The repeller voltage, therefor, can be used to adjust the local frequency to a desired value relative to the R. F. frequency with which it is to be mixed. One conventional method of controlling the repeller voltage is to provide a thyratron for generating a slow sawtooth voltage in an R-C circuit, the instantaneous capacitor voltage constituting the repeller voltage. When the sweep of the local oscillator achieves a predetermined value, the receiver output is a maximum and the frequency of the local oscillator is at the proper value. The thyratron at this instant is made inoperative and the capacitor voltage and the voltage on its repeller stays at the desired voltage value. If a deviation of the transmitter frequency occurs in such a sense as to require a higher voltage on the repeller, the thyratron becomes operative for a time determined by the extent of deviation and the sweep is continued upward to the necessary value. On the other hand, if the deviation is in the opposite sense, the thyratron must make almost a complete sweep before the repeller has the proper voltage applied thereto. Since the sweeps are generally of 1 to 2 cycles per second, an undesirable time delay is incurred. Asymmetry of operation also exists in the conventional circuit because the responsiveness to a deviation of one sense is not the same as for the deviation of opposite sense.

It is the object of this invention to overcome the above mentioned shortcomings in the conventional sweep-type AFC circuit described above, and to provide a circuit which is immediately responsive to, and corrective of, deviations in frequency of either sense.

It is a further object of this invention to provide an AFC circuit which, in addition to being immediately responsive to deviations from a desired frequency, promptly corrects such deviations without sweeping the oscillator over the frequency band.

In accordance with a broad aspect of the invention, there is provided an automatic frequency control circuit for correcting frequency deviations in a local oscillator from its predetermined operating frequency. The AFC circuit comprises a source of sweeping potential which is applied directly or indirectly to the oscillator to operate the oscillator over a range of frequencies. At the desired operating frequency, the sweep is terminated.

The oscillator thereafter is maintained at the proper operating frequency by virtue of a correcting circuit coupled to the oscillator. The correcting circuit is operative in response to a frequency deviation of either sense from the predetermined frequency and produces a voltage proportional to the deviation. This voltage is applied to the oscillator to correct the deviation and maintain the oscillator at the desired frequency. This correction of the deviation is accomplished without operating the sweeping circuit.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 is a block diagram of a portion of a radar receiver;

Fig. 3 is a graphical illustration of the voltage waveform applied to the local oscillator.

Figure 2:
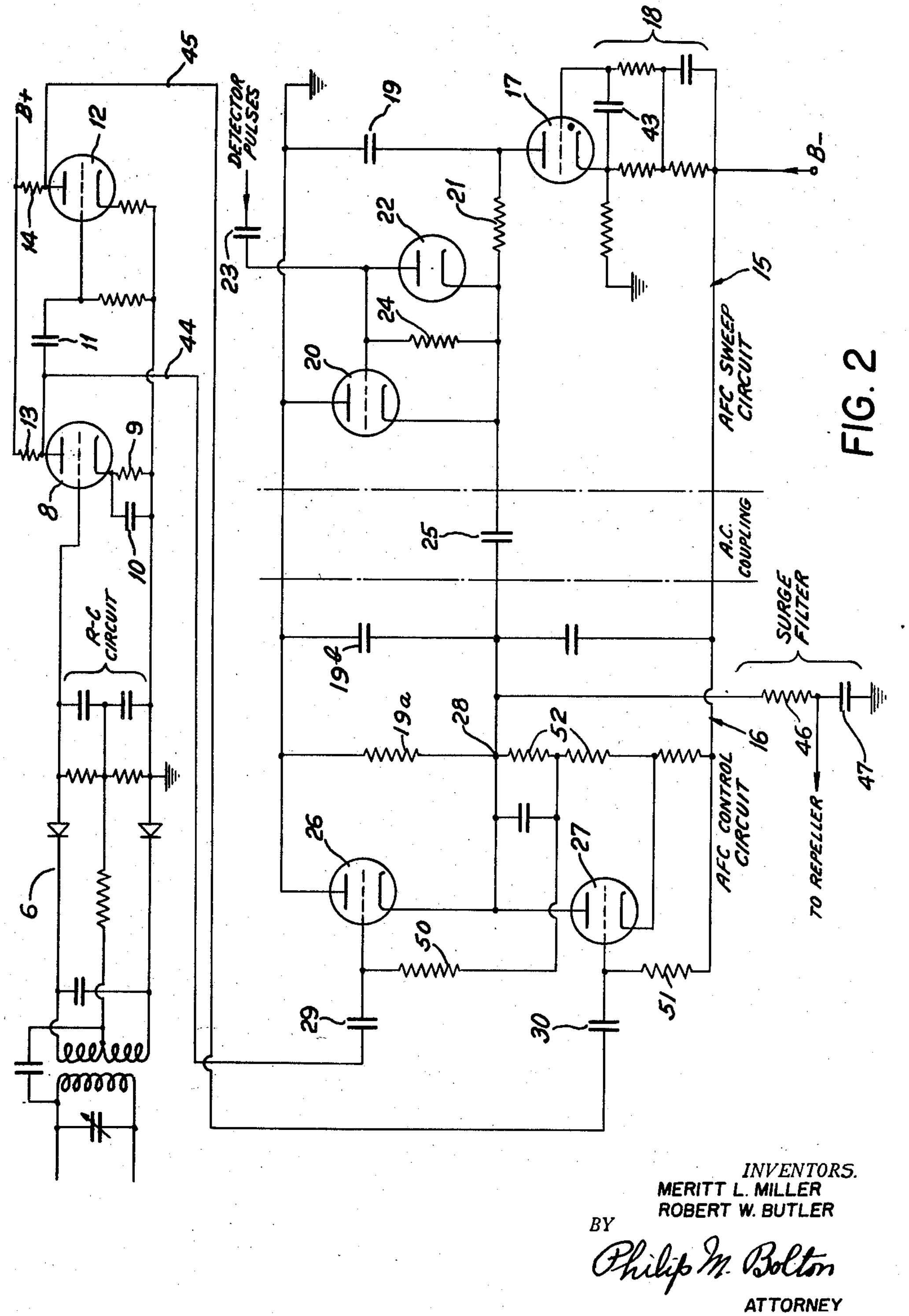
Fig. 2 is a schematic diagram of a preferred embodiment of the AFC circuit together with a discriminator circuit.

Although the invention may be most suitably utilized in a radar system and will be described in connection with the frequency control of a reflex-klystron oscillator, it is to be understood that the principle of our invention may be employed in any system wherein frequency determination is affected by applying a voltage to the oscillator or to a control circuit controlling the oscillator.

Referring first to Fig. 1, of the drawings, there are shown parts of a typical receiving system utilizing AFC. This receiver is usually of the superheterodyne type. R.-F. signals from the antenna enter a mixer 1 where they are combined with the output of a tuned local oscillator 2 to form a heterodyned signal at the desired intermediate frequency. This signal is led from the mixer into an intermediate-frequency amplifier 3 and formed into pulses at detector 4. The output from the detector 4 is led to circuit 5 feeding the cathode ray tube.

The frequency control circuits (shown enclosed by dotted lines) comprises a frequency discriminator 6 which receives energy from the I.-F. amplifier and has a pulse output proportional to a deviation in the operating frequency. The pulse output is led to an AFC control circuit 7 which converts the pulse into a correction voltage to tune the oscillator 2 accordingly. Energy is also fed from detector 4 to the AFC circuit 7, to establish the AFC near the correct operating point.

Referring now to Fig. 2, of the drawings, there is shown schematically a conventional discriminator circuit 6 having an R-C circuit of short time constant for producing pulses. These pulses are led to a grid of amplifier 8, which may be of the triode type, suitably biased by a cathode-resistor 9 and a by-pass capacitor 10. Amplifier 8 is coupled over a coupling capacitor 11 to a second amplifier 12. Plate supply voltage for the anodes of tubes 8 and 12 is supplied from B+ over anode resistors 13, 14 respectively.

The AFC circuit 7 forming the basis of this invention, is coupled between the output of the pulse amplifiers 8 and 12, and the frequency determining electrode of the local oscillator, preferably the repeller electrode of a reflex-klystron (not shown). Of course, the output of the AFC circuit could be satisfactorily connected to a control circuit for the oscillator, such as a reactance tube, instead of directly to the repeller electrode. The AFC circuit may be considered to be divided into two sections, a sweep circuit 15 for generating a sweeping potential and applying the potential to the repeller, and a control or correcting circuit 16 for supplying the necessary voltage to the repeller to compensate for undesirable frequency deviations—after the sweep has been terminated.

The sweep circuit or saw-tooth generating circuit comprises a grid-controlled gas-discharge tube 17 which may be of the thyratron type and a biasing network therefor—generally indicated at 18. The control R-C circuit for the generation of saw-tooth waves comprises capacitor 19, plate-resistance of normally conducting vacuum tube 20, and resistor 21. The instantaneous voltage across capacitor 19 constitutes the repeller voltage. The bias on tube 20 which may be of the triode type, is controlled by a rectifier 22 (vacuum tube or crystal). The anode of rectifier 22 is coupled to the detector circuit 4 of the receiver (Fig. 1) over a coupling capacitor 23. A grid resistor 24 completes the grid-cathode circuit of tube 20 when rectifier 22 is not conducting.

The control or correcting circuit may be coupled to the sweep circuit via a capacitor 25 and comprises a pair of vacuum tubes 26, 27 respectively, connected in voltage divider relationship with the electrical point of division at 28. Suitable biasing resistors 50 and 51 are provided for the tubes 26, 27 to maintain the tubes at or a little below cut-off. The outputs from tubes 8 and 12 are coupled over capacitors 29, 30 respectively, to the grids of tubes 26 and 27 respectively. The relationship of the amplifiers 8 and 12 to the discriminator circuit is such that only one tube amplifies a pulse of positive polarity at a time and the characteristic of the pulse is determined by the magnitude of the frequency deviation; the tube amplifying the pulse is determined by the sense of frequency deviation as will be clear from the description of the operation of the system appearing hereafter.

Figure 4:
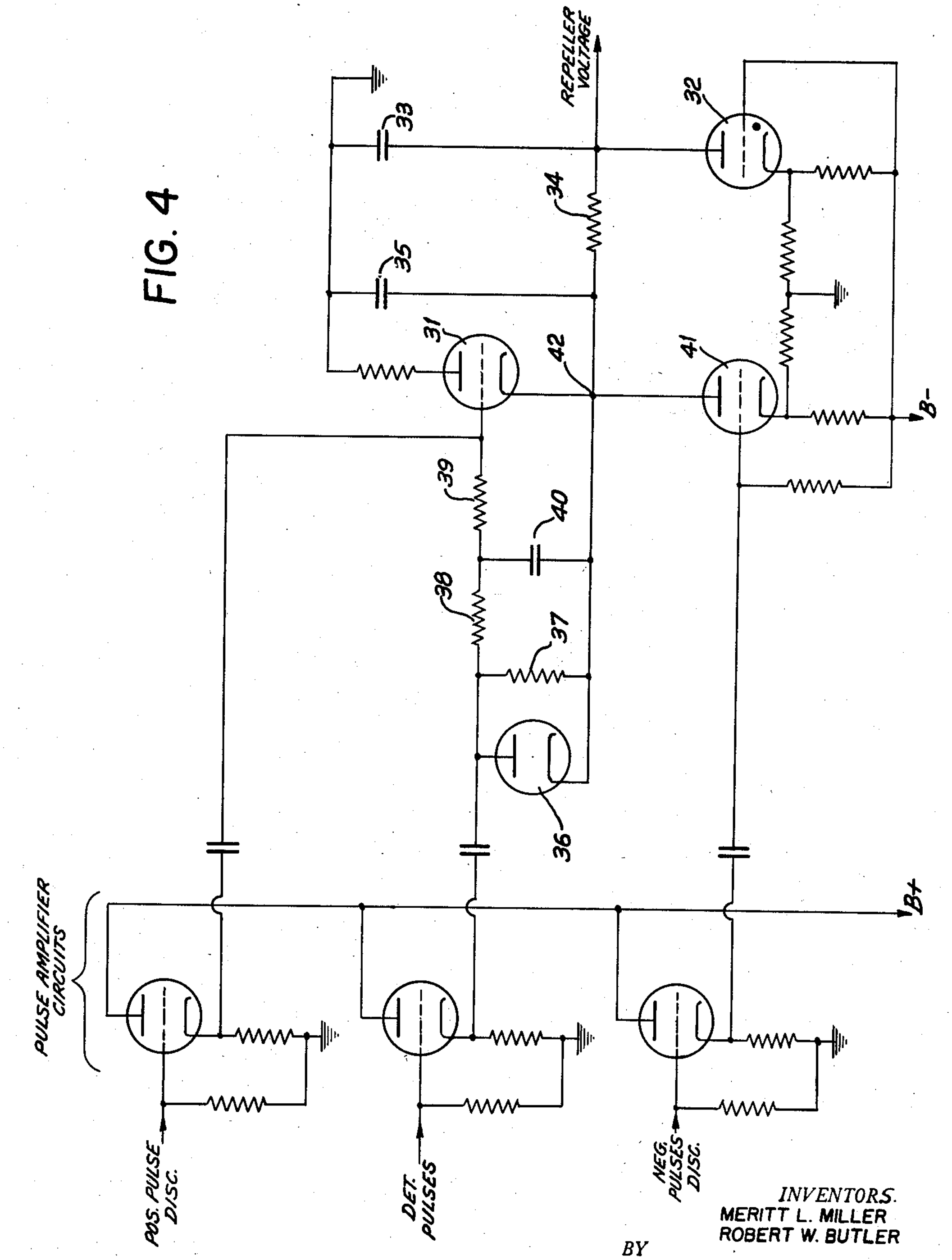
Fig. 4 is a schematic diagram of another embodiment of the invention.

Another embodiment of the invention, which from one point of view may be considered a simplification of the preferred embodiment, is shown by Fig. 4 of the drawings. In this circuit, tube 31 corresponding to tube 20 in Fig. 2, serves the dual function of controlling the operativeness of the thyratron during sweeping, and upon extinguishing the thyratron, serves in the correcting circuit.

The sweep circuit of Fig. 4 comprises a thyratron 32, an R–C circuit comprising capacitor 33, plate resistance of tube 31 and resistor 34. Capacitor 35, together with capacitor 33 and resistor 34, also serve as a filter to the repeller voltage when the sweep circuit is not operating. Bias for tube 31 is provided by rectifier 36; grid resistor 37 completing the grid-cathode circuit for tube 31 when the rectifier 36 is not conducting. Resistors 38 and 39, and capacitor 40 provide a filtering network for the input pulses from the detector.

The thyratron is made inoperative when tube 31 is cut-off (to be explained later), and tube 31 then serves as a voltage divider with vacuum tube 41; the electrical point of division being at point 42. Tubes 31 and 41 are maintained just at cut-off by the biasing resistors when not receiving pulses from the discriminator. The output from the pulse amplifiers are connected similarly as in Fig. 2, to the grids of tubes 31, 41 respectively.

In order to facilitate an understanding of the invention, the operation of these embodiments of the present invention will be described under two assumed conditions—first, when the transmitter is off and the power is first applied to the receiver and particularly to the AFC circuit; and second, when the transmitter is operating.

Under the assumed initial conditions, when the transmitter is off, the discriminator output to the grid of tube 8 is zero even though no pulses are fed to the AFC control circuit 16.

When power is first applied to the AFC circuit, zero initial voltage exists across capacitor 19 (Fig. 2), and thyratron 17 conducts, charging capacitor 19. Tube 20 normally conducts when the power is applied to the AFC circuit. As capacitor 19 charges, the plate-to-cathode voltage of thyratron 17 decreases until a value is reached which is insufficient to sustain conduction. Let us assume that this condition occurs when the voltage across the capacitor 19 reaches 200 volts, as indicated in Fig. 3. As soon as thyratron 17 stops conducting, capacitor 19 discharges through the normally conducting tube 20 and resistor 21, until the plate-to-cathode voltage of thyratron 17 rises sufficiently to again permit conduction. The voltage at which thyratron 17 fires depends upon the magnitude of the voltage built up across capacitor 43. Let us assume that the voltage across capacitor 19 reaches 100 volts when thyratron 17 fires (see Fig. 3). Thus, a saw-tooth waveform having an amplitude of 100 volts (for the assumed values), and with given parameters, a frequency of about 1 C. P. S. is applied to the repeller of the local oscillator. The bias developed by the voltage divider action of biasing resistors 50 and 51 for tubes 26 and 27 normally prevents these tubes from conducting. As the repeller voltage is periodically varied the local oscillator tube (not shown) oscillates during only a small portion of the sweep; for example, between −155 and −185 volts.

When the transmitter is turned on, the sweep circuit continues to generate a saw-tooth waveform until the voltage on the repeller reaches a predetermined value for our example −170 volts at which the proper local oscillator frequency is obtained. At this local oscillator frequency the resulting R. F. current passes through the I. F. amplifier to the detector and there produces output pulses. These pulses are applied over capacitor 23 causing diode 22 to conduct and charge capacitor 23, thus imposing a negative cut-off bias on the normally conducting tube 20, thereby terminating the sweep of the thyratron. Since the discharge circuit for capacitor 19 is blocked, the repeller voltage is held constant at the cut-off voltage and is equal to the voltage across the capacitor. Thus, the sweep circuit functions to bring the repeller voltage into the correct range or to re-establish correct operation if the AFC circuit is thrown out of the correct range at any time during operation.

When now a frequency deviation occurs, the discriminator will produce a pulse indicative of a deviation of a particular sense and magnitude. For example, if the frequency is too high, a negative pulse is produced on the grid of amplifier 8 and a positive pulse is derived from its anode and applied over lead 44 to the grid of tube 26. The positive pulse from the anode of tube 8 is also applied over the coupling capacitor 11 to the grid of tube 12 to produce a negative pulse which is applied over lead 45 to the grid of tube 27. However, tubes 26 and 27 are biased to conduct only on positive pulses, therefore tube 27 will not conduct and only tube 26 will operate in response to the high frequency deviation. Thus the positive pulse on the grid of tube 26 increases the grid potential slightly above cut-off, causing tube 26 to conduct proportionally to the magnitude of the pulse, thereby changing the voltage at junction 28. It is seen that when tube 26 conducts, the electron path includes the resistors 52 in shunt with 27, and when tube 27 conducts, the path includes the resistor **19*a* in shunt with tube 26. The voltage change at junction 28 has a corresponding change on the voltage across the capacitor 19*b* by reducing or increasing its charge depending upon which tube is conducting. In the case of tube 26 conducting, indicating a high frequency deviation, the voltage will be such as to reduce the charge across capacitor 19*b*, thus reducing the voltage on the repeller. Therefore, it is seen that the voltage change produced by the conduction of either tube 26 or 27 is a corrective voltage as applied to the capacitor 19*b* to remove the undesirable deviation. Now when the frequency deviation is in the opposite sense, i. e., lower than the predetermined operating frequency, a positive pulse is applied to the grid of amplifier 8 producing a negative pulse on the anode thereof which causes amplifier 12 to produce a positive pulse which is applied over lead 45 to operate tube 27. Under these conditions only tube 27 will conduct to vary the repeller voltage as seen at point 28**. Therefore, the correcting circuit is, in effect, a voltage divider circuit correcting frequency deviations without causing the sweep circuit to reiterate sweeping to find the proper repeller voltage.

A filter network comprising resistor 46 and capacitor 47 is provided to remove the surges from the repeller electrode.

In the above circuit coupling capacitor 25 is used to remove the D. C. component from the thyratron output which might cause conduction of tube 26. However, the circuit has been made to operate without this coupling capacitor.

With respect to Fig. 4, operation is similar to that of the circuit shown in Fig. 2 except that tube 31 serves both as a control tube for terminating the sweep of thyratron 32 and upon terminating the sweep, as a voltage divider with tube 41. The pulses applied to the grids of tubes 31 and 41 respectively are the same as described in connection with Fig. 2. Although the embodiment exemplified by this figure might be considered a simplification of the preferred embodiment, there exists an asymmetry between tubes 31 and 41 due to this circuit containing the diode 36. However, in certain applications this circuit might be advantageously used.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An automatic frequency control circuit, adapted to operate in conjunction with an oscillator of the klystron type intended to operate at a predetermined frequency, for correcting undesirable frequency deviations in said oscillator, including a discriminator circuit for producing distinct and separate pulses in response to frequency deviations of different senses and magnitude, and comprising means coupling said discriminator circuit to said oscillator for correcting said deviations; said means comprising a sweep-producing circuit for producing a sweeping potential and including a gas discharge tube and a control capacitor coupled thereto, means applying said sweeping potential to a frequency control electrode of the oscillator to operate said oscillator over a range of frequencies, a control device operatively coupled to said sweep-producing circuit to terminate and hold said sweep at a fixed potential at which the oscillator is operating at the predetermined frequency, said control device comprising a normally conducting three element vacuum tube, the anode of said tube being connected to a terminal of said capacitor to permit the capacitor to discharge therethrough, a normally non-conducting diode connected across the grid and cathode of said tube, means for rendering said diode conducting to cut off said normally non-conducting tube, thus blocking the discharge circuit for the capacitor and terminating the sweep, the sweep voltage being equivalent to the instantaneous voltage across said capacitor, said terminal voltage at which the sweep is terminated is the voltage at which the oscillator operates at the predetermined frequency, a correction circuit operative independently of said sweep-producing circuit and coupled between said discriminator and said oscillator, and operative in response to said discriminator pulses to produce a voltage corrective of said deviation, and means coupling said correction circuit to said sweep-producing circuit for applying said voltage to the fixed potential to correct said frequency deviation.

2. The circuit according to claim 1, wherein the discriminator has separate outputs for pulses indicating negative and positive senses of deviation respectively, said correction circuit comprising a voltage divider network operatively coupled to said capacitor, the point of electrical division having a value equivalent to the capacitor voltage, said voltage divider comprising a pair of normally non-conducting serially connected three element vacuum tubes, the respective grids of said tubes being connected to the respective outputs of said discriminator, whereby a pulse from said discriminator operates the tube connected thereto, to vary the potential across the capacitor in accordance with the magnitude of, and the sense indicated by the pulse until the terminal potential is attained.

3. An automatic frequency control circuit comprising first means for producing a sweeping potential and including a control circuit over which said sweeping potential appears, an output circuit coupled to said control circuit for conducting said sweeping potential therefrom, a terminating circuit coupled to said control circuit for terminating and holding said sweeping potential at a fixed value, and two alternatively operable correction circuits coupled to said control circuit for adjusting said fixed value of potential, one of said correction circuits serving to adjust said fixed value upwardly and the other of said correction circuits serving to adjust said fixed value downwardly.

4. An automatic frequency control circuit comprising first means for producing a sweeping potential and including a control circuit over which said sweeping potential appears, an output circuit coupled to said control circuit for conducting said sweeping potential therefrom, a terminating circuit coupled to said control circuit for terminating and holding said sweeping potential at a fixed value, a first correction circuit coupled to said control circuit for adjusting said fixed value of potential upwardly, and a second correction circuit coupled to said control circuit for adjusting said fixed value downwardly.

5. An automatic frequency control circuit comprising first means for producing a sweeping potential and including a control circuit over which said sweeping potential appears, an output circuit coupled to said control circuit for conducting said sweeping potential therefrom, a terminating circuit coupled to said control circuit for terminating and holding said sweeping potential at a fixed value, a first normally non-conductive device coupled to said control circuit for adjusting said fixed value of potential upwardly, a second normally non-conductive device coupled to said control circuit for adjusting said fixed value downwardly, and means for alternatively rendering said first and second devices conductive, whereby said fixed value of potential can be adjusted in a desired direction.

6. An automatic frequency control circuit comprising a generator for producing a sweeping potential and having a frequency-determining circuit, a capacitor forming part of said frequency-determining circuit, a normally conducting device coupled in shunt with said capacitor, means coupled to said normally conductive device to render said device non-conducting thereby blocking the discharge path of said capacitor and terminating said sweeping potential, means for coupling the terminated sweeping potential from said generator, a first correction circuit coupled across said capacitor, a second correction circuit coupled across said capacitor, said correction circuits being alternatively operative to produce corrective potentials of opposite sense which are imposed on said capacitor, and means for alternatively actuating said first and second circuits.

7. An automatic frequency control circuit comprising a generator for producing a sweeping potential and having a frequency-determining circuit, a capacitor forming part of said frequency-determining circuit, a normally conducting device coupled in shunt with said capacitor, means coupled to said normally conductive device to render said device non-conducting thereby blocking the discharge path of said capacitor and terminating said sweeping potential, means for coupling the terminated sweeping potential from said generator, a first normally non-conductive device coupled to said capacitor for adjusting the potential thereof upwardly, a second normally non-conductive device coupled to said capacitor for adjusting the potential thereof downwardly, and means for alternatively rendering said first and second devices conductive whereby the value of potential over said capacitor may be adjusted in a desired direction.

References Cited in the file of this patent

UNITED STATES PATENTS

| | | |
|---|---|---|
| 2,287,925 | White | June 30, 1942 |
| 2,434,294 | Ginzton | Jan. 13, 1948 |
| 2,448,069 | Ames et al. | Aug. 31, 1948 |
| 2,452,575 | Kenny | Nov. 2, 1948 |
| 2,492,018 | Sustein | Dec. 20, 1949 |
| 2,541,454 | White | Feb. 13, 1951 |
| 2,562,304 | Durand | July 31, 1951 |
| 2,594,263 | Munster | Apr. 22, 1952 |
| 2,686,877 | Lawson | Aug. 17, 1954 |
| 2,698,904 | Hugenholtz | Jan. 4, 1955 |
| 2,705,756 | Strandberg | Apr. 5, 1955 |